Patented May 1, 1945

2,375,103

UNITED STATES PATENT OFFICE 2,375,103

PROTEIN PLASTIC COMPOSITION

Stuart A. Harrison, Akron, Ohio, assignor to The B. F. Goodrich Company, New York, N. Y., a corporation of New York No Drawing. Application May 22, 1943, Serial No. 488,093

6 Claims. (Cl. 106—149)

This invention relates to prolamine compositions and pertains more specifically to the prevention of deterioration of such compositions upon aging.

The prolamines are a well known class of proteins, characterized by insolubility in water, absolute alcohol, and other neutral solvents, and by solubility in strong aqueous alcohols. The most common of the prolamines are those obtained from seeds of cereal grains, among which are zein (from corn), gliadin (from wheat), and hordein (from barley). Although there are other so-called prolamines, such as those derived from milk, they have somewhat different chemical properties. The term prolamine as used herein is employed in its strict sense to include only zein and such other proteins as are soluble in aqueous alcohol and have chemical properties similar to those of zein.

It is well known that such prolamines may be insolubilized or condensed by means of formaldehydes, trioxymethylene, paraformaldehyde, hexamethylene tetramine, or the like to produce solid materials ranging from soft plastic masses to relatively hard and brittle materials, depending upon the conditions used. The reagents used to bring about such change are known in the art as hardening agents, and will be thus referred to hereinafter.

The properties of the hardened prolamine may be modified by the addition of other materials, for example glutinizing agents such as organic acids or bases, plasticizers, pigments, or fillers either before or after the hardening treatment, preferably before it.

By such treatment it has been found possible in the past to produce materials having a variety of properties, ranging from jelly-like or glue-like substances to those resembling leather or hard rubber. However, such products have tended to deteriorate upon aging, losing their resiliency and becoming brittle and stiff after as short a time as two weeks at ordinary temperatures, even when large amounts of plasticizer were used. In addition to losing resiliency, such compositions also tend to crack and rupture readily when flexed after aging.

I have now discovered that such prolamine compositions may be stabilized, that is, may be prevented from deteriorating, by incorporating therein a small amount of a polyamide which contains from two to five groups of the structure

and which is free from groups, other than amido, reactive with prolamines. Among such undesirable reactive groups are aldehyde, carboxylic acid, acid chloride, ester, and aromatic hydroxy groups, for example. Either primary, secondary, or tertiary polyamides may be employed. In general, the diamides, that is, those compounds containing two such

groups are preferred to other polyamides. That is, compounds having the structure

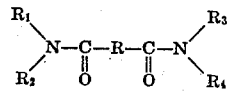

in which R is a hydrocarbon group and $R_1$, $R_2$, $R_3$, and $R_4$ are members of the class consisting of hydrogen and hydrocarbon groups, and also those having the structure

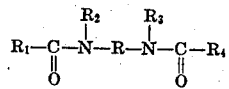

where R, $R_1$, and $R_4$ are hydrocarbon groups, and $R_2$ and $R_3$ are hydrogen or hydrocarbon groups, are preferred.

The diamides used in the process of my invention may be prepared by any of the usual methods. For example, dicarboxylic acid chloride may be reacted with ammonia or with an amine, or a monocarboxylic acid chloride may be reacted with a diamine. Among the diamides which are suitable for use in my invention are oxamide; malonamide; succinamide; glutaric diamide; N,N'-diacetyl glutaric diamide; 1,2-bis (acetamido) ethane; 1,2-bis (propionamido) ethane; 1,2-bis (butyramido) ethane; 1,2-bis (acetamido) propane; 1,2-bis (propionamido) propane; 1,3-bis (acetamido) propane; 1,4-bis (acetamido) butane; 1,5-bis (acetamido) pentane; 2,4-bis (acetamido) pentane; 1,6-bis (acetamido) hexane; 1,2-bis (diacetamido) ethane; N,N'-diacetyl-o-phenylenediamine; N,N'-dibenzoyl-o-phenylenediamine; N,N'-bis (2-nitrobenzoyl)-o-phenylenediamine; N,N'-di(p-toluyl)-o-phenylenediamine; N,N' - diacetyl - m - phenylenediamine; N,N' - dibenzoyl - m-phenylenediamine; N,N'-diacetyl-p-phenylenediamine; 5 - nitro - 1,2,3 - tris(acetamido) benzene; 1,2,6-tris(acetamido) naphthalene; 1,2,4,5-tetrakis (acetamido) benzene; and other similar compounds containing from two to five amido groups.

My new stabilizing agents may be incorporated in the prolamine composition by any of the usual methods, for example by means of a heated roll mill or an internal mixer. They may be used in small amounts, ranging from 0.5 to 5.0% or more of the composition.

It has been found that my new stabilizers are also effective anti-scorch agents; that is, they prevent premature setting up of the composition by delaying the action of the hardening agent. This delaying action is important because prolamine compositions are mixed at elevated temperatures, sometimes as high as 200° F., and premature setting up of the mass during this mixing period causes the resultant composition to be a crumbly, non-homogeneous mixture which is incapable of being subsequently processed into a useful form.

The following specific example will serve more fully to illustrate the nature of my invention.

Example

The following compositions, in which the parts are by weight, were prepared by mixing the ingredients on a roll mill at about 130° F.

|  | A | B |
| --- | --- | --- |
| Zein | 600 | 600 |
| Dibutyl tartrate | 540 | 540 |
| Ricinoleic acid | 150 | 150 |
| Paraformaldehyde | 30 | 30 |
| 1,2-bis (acetamido) ethane |  | 60 |

These two compositions were then heated in a press for 60 minutes at 275° F. after which they were resilient, rubbery sheets resembling vulcanized rubber. Upon aging 40 hours in air at 70° C., however, composition A was brittle, stiff, and readily ruptured upon repeated flexing, whereas composition B retained its original resiliency and resistance to rupture by flexing.

Similar results may be obtained by incorporating other similar diamides in zein or other prolamine compositions.

Although I have herein disclosed specific examples of my invention, I do not intend to limit myself solely thereto, but to include all the obvious variations and modifications within the scope of the appended claims.

I claim:
1. A composition comprising a prolamine which has been treated with a hardening agent in the presence of from 0.5 to about 5 percent of a compound containing from two to five groups of the structure

said compound containing, in addition to the oxygen and nitrogen of said amido groups, only carbon and hydrogen.

2. A composition comprising a prolamine which has been treated with a hardening agent in the presence of from 0.5 to about 5 percent of a compound containing two groups of the structure

said compound containing, in addition to the oxygen and nitrogen of said amido groups, only carbon and hydrogen.

3. A composition comprising zein which has been treated with a hardening agent in the presence of from 0.5 to about 5 percent of a compound containing two groups of the structure

said compound containing, in addition to the oxygen and nitrogen of said amido groups, only carbon and hydrogen.

4. A composition comprising zein which has been treated with a hardening agent in the presence of from 0.5 to about 5 percent of a diamide of a hydrocarbon dicarboxylic acid.

5. A composition comprising zein which has been treated with a hardening agent in the presence of from 0.5 to about 5 percent of a diamide of a hydrocarbon diamine.

6. A composition comprising zein which has been treated with a hardening agent in the presence of from 0.5 to about 5 percent of 1,2-bis (acetamido) ethane.

STUART A. HARRISON.